June 21, 1966     A. J. WHITE     3,256,609

DIAL SNAP GAUGE

Filed Sept. 24, 1963     2 Sheets-Sheet 1

INVENTOR
ALBERT J. WHITE

June 21, 1966      A. J. WHITE      3,256,609

DIAL SNAP GAUGE

Filed Sept. 24, 1963      2 Sheets-Sheet 2

United States Patent Office 3,256,609
Patented June 21, 1966

3,256,609
DIAL SNAP GAUGE
Albert J. White, Kingston, N.Y., assignor, by mesne assignments, to B. C. Ames Co., Waltham, Mass., a corporation of Massachusetts
Filed Sept. 24, 1963, Ser. No. 311,165
10 Claims. (Cl. 33—147)

The present invention relates to precision gauging apparatus and more particularly to a dial snap gauge construction and a transfer mechanism therefor.

Known gauges of the type herein contemplated are generally complex precision instruments composed of numerous intricate parts which are difficult to fabricate, assemble and/or repair. One of the more critical elements in a gauge apparatus is the transfer mechanism which transfers the displacement of a movable plunger, which may be actuated by a gauge anvil, to produce a corresponding displacement in the indicator mechanism. Transfer mechanisms of the prior art include spring-reed structers, highly complex cam mechanisms, or pin and lever combinations. The more common pin and lever combinations generally comprise a small diameter pin which enters a lever and also serves as the pivot point for the transfer such that the pin is subject to a high concentration of wear over a small contact area, resulting in inaccurate measurement and necessitating frequent replacement. Since the transfer mechanism in coventional snap gauges is generally subject to a fixed relationship within the frame, any servicing of the transfer mechanism generally necessitated conmplete disassembly of the gauge apparatus either at the factory or by highly skilled labor with its concomitant cost. The extreme torque at the point of pivot and the inherent retardation or mechanical impedance within the conventional dial indicator mechanism necessitated that considerable tension or force be applied to snap the gauge onto the workpiece, thereby contributing to the low sensitivity of conventional snap gauges. Combinations of the above factors result in the low degree of repeatability attainable by conventional snap gauges, i.e., the ability of the dial indicator to return to the same gradation mark on the dial face each time the snap gauge is applied to a known master. The repeatability of conventional snap gauges is such that frequent calibration by a known master is required, and such gauges are generally subject to a low wear life factor.

These and other limitations of the prior art are overcome in accordance with the present invention, which provides a highly sensitive snap gauge employing a novel, positive transfer mechanism in which the drag or mechanical impedance associated with conventional transfer mechanisms is virtually eliminated. The transfer mechanism comprises essentially a roller block assembly including a relatively large roller serving as a pivot point through which the transfer lever extends. The relatively large contact area of the roller surface over which any friction resulting from transfer is distributed provides an extensive wear life factor compared to the more conventional transfer mechanisms. The transfer mechanism is designed along capsule or modular principles as an independent unit relative to its relationship to the frame to facilitate construction, assembly and servicing, and the roller assembly can be readily disassembled for servicing and reassembled or replaced as required without necessitating realignment or in most cases recalibration. In addition, a multiplication of the actual measurement of the work piece can be achieved by the relative placement of the roller assembly within the gauge apparatus. Another novel feature used to further extend the life of the transfer mechanism is the use of a cylindrical rather than the conventional rectangular transfer lever whereby the lever can be transposed or rotated to a new position at intervals or as noticeable wear develops, thus extending the wear life of the lever while maintaining constant and positive contact to assure continued accuracy of measurement. The friction or mechanical impedance within the gauge mechanism itself is virtually eliminated by the use of knife edges on the gauging and measuring plungers associated with the transfer mechanism, whereby substantially the same point of contact is maintained in the balanced position as in the unbalanced. The instant invention is characterized by high accuracy, minimum number of parts, extreme sensitivity and high degree of repeatability as well as simplicity of construction, assembly, and servicing.

Accordingly, a primary object of the invention is to provide an improved dial snap gauge.

Another object of the present invention is to provide an improved transfer mechanism for a dial snap gauge Still another object of the present invention is to provide an improved snap gauge transfer mechanism comprising a roller-lever assembly having a relatively large contact area for friction dissipation.

Still another object of the present invention is to provide a snap gauge having knife edges associated with the transfer mechanism to reduce the mechanical impedance of the gauge apparatus.

A further object of the present invention is to provide an improved dial snap gauge wherein the actual measurement of the workpiece can be multipled or divided by the transfer mechanism.

The foregoing and other objects, features and advantages of the invention will be apparent from the following more particular description of preferred embodiments of the invention, as illustrated in the accompanying drawing, in which.

Figure 1:
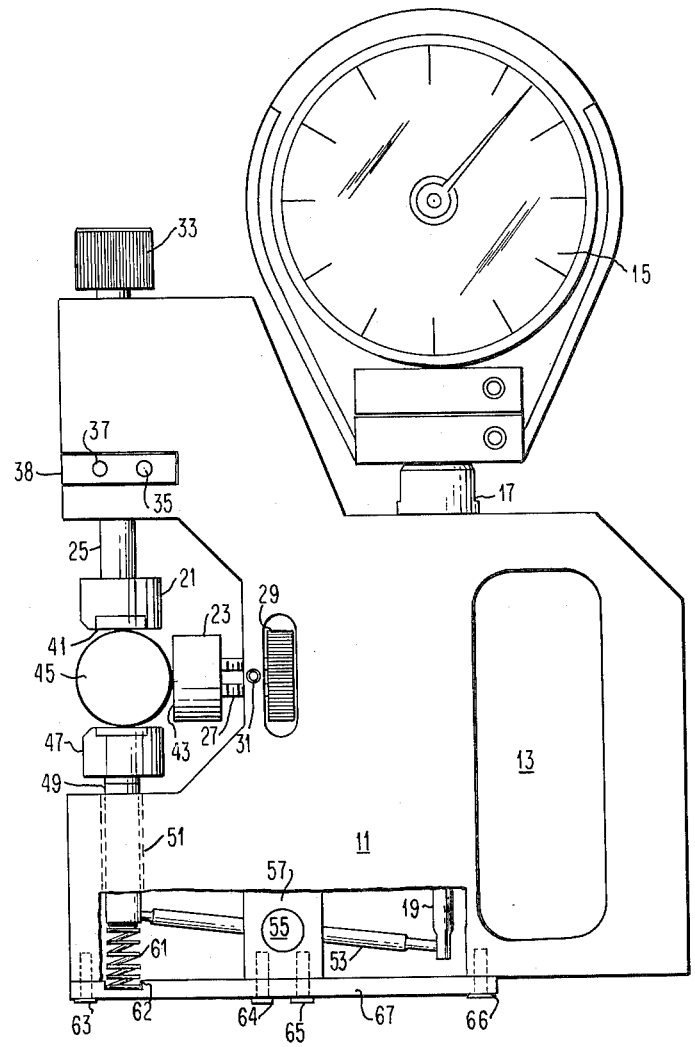
FIG. 1 is a side elevation view of the snap gauge incorporating the instant invention having cutaway portions to illustrate the transfer mechanism.

Referring now to the drawings and more particularly to FIGURE 1 thereof, there is illustrated an expanded plan view of a dial snap gauge having cutaway portions to illustrate certain details of the present invention. A frame 11 representative in outline of typical snap gauges is provided with an opening 13 to form a handle for gripping the gauge, although it will be appreciated that any type handle or grip could be utilized or attached. An indicator 15 is suitably mounted on the frame 11 via adaptor 17 through which a measuring plunger 19 extends to provide direct contact to dial indicator 15 when actuated by the transfer mechanism as more fully described hereinafter. When fully assembled, the dial assembly includes a recessed portion for adaptor 17 such that the indicator is mounted directly on the frame and may be rotatably adjusted about adaptor 17 to conform to the preference of the viewer. Two adjustable anvils 21 and 23 are mounted at 90° intervals on respective rods 25 and 27. Anvil 23 is adjusted by knurled nut 29, mounted within a bore opening of frame 11. When adjusted to the desired position depending on the size of the workpiece to be measured, the anvil is locked in its adjusted position by lock screw 31. Anvil 21 is connected through rod 25 mounted inside a bushing, not shown, to knurled nut 33. When adjusted to the desired position, anvil 21 is locked in its selected position by means of locknut 35. Rod 25 has a flat surface against which pin 37 abuts to prevent rotational variation of anvil 21. Locknut 35 and pin 37 are mounted in a separate block 38 flush with frame 11.

Figure 3:
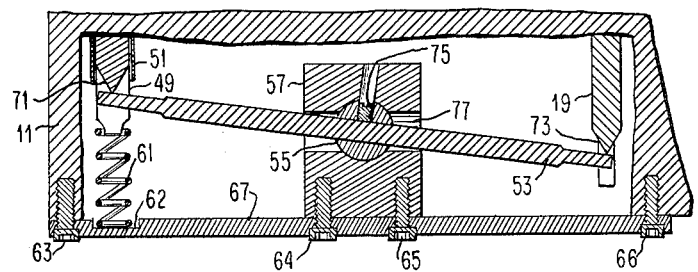
FIG. 3 is a front elevation view of the transfer mechanism in section taken along the plane of the lines 3—3 of FIG. 2.

As is conventional with snap gauges, anvils 21 and 23 have faces or contact surfaces 41 and 43, respectively disposed to slide over the work-piece 45 at points 90° apart along the periphery of the workpiece. Movable anvil 47, disposed 90° from anvil 23 along the periphery of workpiece 45, is mounted at the end of measuring plunger 49 which extends through guide bushing 51. Measuring plunger 49 is maintained in its normal position by tension from spring 61, the bottom portion of which rests within a recessed opening 62 of the base of the frame. For purposes of discussion, it is assumed that the center line drawn through anvils 21 and 47 is exactly parallel to the bore opening for the indicator measuring plunger 19. The lower portion of plunger 49 incorporates a knife edge in contact with lever arm 53, as shown in FIGURE 3, the knife edge providing a minimum of friction at the point of contact with the lever arm. Lever 53 has identical shoulders on both ends to facilitate assembly and allow for transposing in the event of excessive wear on either end. When combined with the knife edge contact on the lower part of plunger 19, the knife edge contact of plunger 49 affords a minimum of friction, thus opposing motion in either direction to maintain almost the exact point of contact at the position of balance as at unbalance.

In operation, moving or snapping the gauge onto workpiece 45 forces anvil 47 and plunger 49 down into guide bushing 51. The knife edge of plunger 49 forces the left arm of lever 53 down, in turn causing the right arm of the lever to raise indicator plunger 19 for direct contact to the dial indicator. Thus, in one cycle, acting as a comparator, the dial snap gauge will measure any dimensional variation of workpiece 45 once the gauge is set to a known master. Removing the gauge from the workpiece then allows anvil 49 to return to the free position through the action of coil spring 61, while the spring tension within the dial indicator, not shown, plus the gravitational fall of plunger 19 permits the return of all moving parts to the free position.

Figure 2:
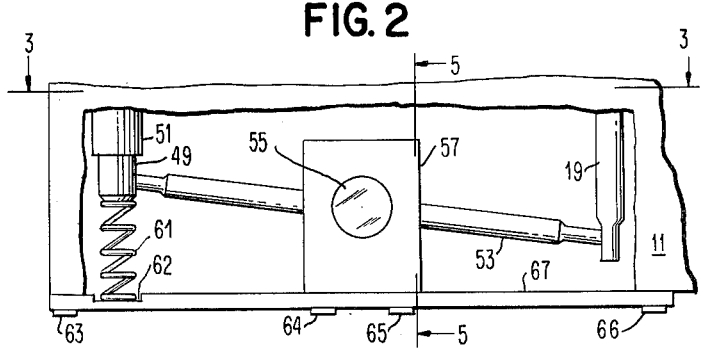
FIG. 2 is a front elevational view of the snap gauge transfer mechanism of FIG. 1.

Referring now to FIGURE 2, there is illustrated an enlarged view of the unique transfer mechanism which provides extreme sensitivity due to the virtual elimination of drag or mechanical impedance afforded by conventional transfer mechanisms. Consisting of only three pieces, roller 55, roller block 57, and lever 53, this transfer mechanism affords effectively a reversal of an ordinary lever motion in that the lever 59 extends through the roller 55, roller 55 serving as the pivot. This system may be contrasted with the conventional pin and lever transfer mechanism in which a small diameter pin enters the lever and also serves as the pivot point. Since roller 55 has a relatively large surface area relative to general gauge design, any pressure encountered in the gauging operation is distributed over a considerably larger area. Due to the large contact area or peripheral surface of roller 55 over which the transfer friction may be spread, the wear life factor of both the roller 55 and roller block 57 is extended greatly beyond that of ordinary gauges. Further, by the use of knife edge contacts, the inherent drag or mechanical impedance of conventional transfer mechanism is virtually eliminated. Another unobvious advantage of the transfer mechanism of the instant invention is that coil spring 61 associated with plunger 49 is completely divorced from direct contact with the transfer lever 53, thus preventing any action of the return spring from influencing the behavior of the transfer mechanism. The transfer mechanism of the instant invention is adapted for ready replacement, removal thereof requiring merely the loosening of lock screws 63 and 66, screws 63 and 66 securing the transfer mechanism to the frame. Screws 64 and 65 in turn secure the roller block 57 to the base 67 of the transfer mechanism. Thus, substantially immediate replacement of the transfer mechanism or a portion thereof may be made by relatively unskilled labor, compared to the more common practice of returning the gauge to the factory for repair or replacement. Another unique aspect of the present invention is that lever 53 is cylindrical compared to the conventional rectangular lever such that the wear life of the lever arm can be extended indefinitely by rotating the lever to a new position at intervals or as noticeable wear is developed. Thus points of contact may be maintained constant and positive such that inaccuracy of measurement is considerably less than conventional gauges.

Figure 5:
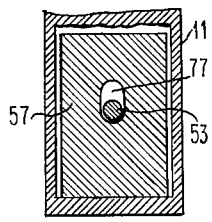
FIG. 5 is a side view of the transfer mechanism in section taken along a plane of line 4—4 of FIG. 2.

Referring now to FIGURE 3, the transfer mechanism is shown in section to clarify further details thereof. The knife edges 71 and 73 of the measuring and indicator plungers 49 and 19 respectively intersect the opposite shoulder portions of lever 53 to provide only a point contact at the intersections. The lower portion of the plungers comprises a doubled pronged arrangement which overlaps the shoulder portions of the transfer lever 53 in the manner illustrated in FIGURE 2. When the transfer lever is placed through the opening in the roller, it is locked in position by recessed set screw 75, mounted perpendicular to lever 53. The opening 77 in the roller block, further shown in FIGURE 5, is sufficient to permit the transfer rod to pivot between its extremities.

Figure 4:
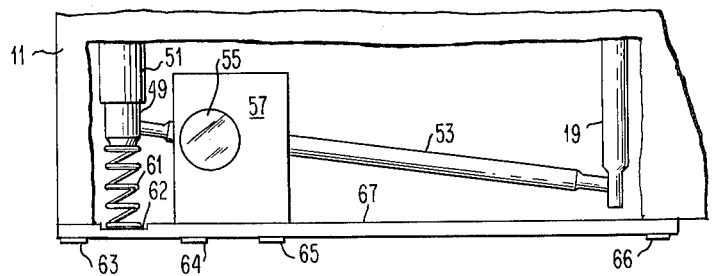
FIG. 4 is a front elevation view of a modified snap gauge transfer mechanism arranged to provide a multiple of the actual measurement.

Referring now to FIGURE 4, an arrangement for providing a 5:1 multiplication factor in the transfer mechanism is illustrated. The transfer mechanism as shown in FIGURES 1 to 3 is positioned to provide a positive 1:1 transfer such that the distance from the center of the roller to contact points 71 and 73 of lever 53 is equal. However, it may be desirable for economy, convenience, etc., to utilize a larger dial indicator which could be recalibrated. In this instance, the roller block assembly would be shifted to the left such that the ratio of lever arms conforms to the desired multiplication. In the illustrative drawing shown in FIGURE 4, the distance from the center of roller 55 to the center line of the indicator plunger 19 is assumed to be 5 times the distance from the roller center to the center line of measuring plunger 51. To limit the opening within the roller assembly to a reasonable degree, the roller 55 is offset from the center of the block assembly in the manner illustrated in FIGURE 4. In the FIGURE 4 embodiment, the measurement afforded by the measuring plunger is increased fivefold as reflected in the indicator. Alternatively, moving the roller assembly to the center would provide a corresponding decrease in the indicator output in accordance with the aforesaid ratio. Utilizing this technique, it is possible to design a series of snap gauges of varying size utilizing a single indicator with varying calibrations.

In the preferred embodiment of the instant invention, the anvils are of carbide tipped steel, the transfer assembly made of tool steel. Prior to use, as is common practice, the dimension to be measured may be set on the indicator by the use of conventional gauge blocks.

While the invention has been shown and described with reference to preferred embodiments, it will be understood by those skilled in the art that various changes in form and details may be made without departing from the spirit and scope of the invention.

What is claimed is:
1. A dial snap gauge comprising in combination a frame, a plurality of anvils attached to said frame, said anvils including one moveable anvil, an indicator device associated with said frame, a plunger associated with said indicator device and means for actuating said indicator device in response to motion of said moveable anvil, said actuating means including a transfer mechanism comprising a roller-lever combination wherein said lever extends through said roller.

2. A device of the character claimed in claim 1 wherein said lever is engaged on opposite ends by a plunger associated with said moveable anvil and said plunger associated with said indicator device.

3. A device of the character claimed in claim 2 wherein said lever is engaged by knife edges of said moveable anvil plunger and said indicator plunger.

4. A dial snap gauge comprising in combination a frame having a plurality of openings therein, a plurality of anvils including a moveable anvil associated with said openings, a first plunger actuated by said moveable anvil, an indicator mounted on said frame, a transfer mechanism associated with said moveable anvil, said transfer mechanism comprising a roller lever combination said lever extending through said roller, a bore opening extending longitudinally of the base of said frame, and a second plunger mounted in said bore opening, said second plunger being driven through said transfer mechanism to actuate said indicator in response to the motion of said moveable anvil.

5. An apparatus of the type claimed in claim 4 wherein the contacting surface of said first and second plungers is designed for minimum frictional contact with said transfer lever.

6. An apparatus of the type claimed in claim 5 wherein said contacting surface of said plungers includes knife edge contacts to engage said transfer lever.

7. An apparatus of the type claimed in claim 4 wherein said transfer lever is adapted for rotation or transposition in the event of contact wear.

8. A snap gauge for measuring the dimensions of a workpiece surface comprising a frame structure having a plurality of openings therein, a measuring anvil in one of said openings, a plunger connected to said anvil, a transfer mechanism attached to said frame, said transfer mechanism comprising a roller lever combination, means connecting one end of said lever to said plunger, an indicator and means actuating said indicator through said transfer mechanism for providing an indication of the dimensions of said workpiece measured by said snap gauge said roller-lever combination comprising a block, a roller mounted in said block, said lever being mounted through an opening in said roller.

9. A dial snap gauge comprising a frame having a plurality of adjustable fixed anvils and a moveable anvil mounted thereon, a dial indicator mounted on said frame and rotatably adjustable relative thereto, a first plunger attached to said moveable anvil, spring bias means for maintaining said first plunger in its normal position, means for providing a positive transfer of motion from said first plunger to said indicator, said means including a transfer mechanism comprising a block attached to said frame, a roller mounted in said block, a lever extending through said roller, a second plunger connected between said indicator and said transfer mechanism and means connecting said first and second plungers to opposite extremities of said transfer mechanism to provide an indication of the dimensions of a workpiece measured by said gauge.

10. A device of the character claimed in claim 12 wherein said connecting means comprises the knife edge contacts of said plungers and the cylindrical surface of said lever.

References Cited by the Examiner

UNITED STATES PATENTS

| | | | |
|---|---|---|---|
| 743,147 | 11/1903 | Church | 74—522 X |
| 1,639,321 | 8/1927 | Wheelock. | |
| 1,648,428 | 11/1927 | Stacey | 33—172 |
| 2,190,961 | 2/1940 | Webber | 33—172 |
| 2,940,332 | 6/1960 | Teague | 74—522 |

FOREIGN PATENTS 410,131  2/1925  Germany.

LOUIS R. PRINCE, *Primary Examiner.*

ISAAC LISANN, ROBERT B. HULL, D. McGIEHAN,
*Assistant Examiners.*